United States Patent
Wu et al.

(10) Patent No.: US 7,202,617 B2
(45) Date of Patent: Apr. 10, 2007

(54) CIRCUIT AND METHOD FOR CONTROLLING BRUSHLESS DC MOTOR

(75) Inventors: Zhigan Wu, Taoyuan Hsien (TW);
Genfu Zhou, Taoyuan Hsien (TW);
Jianping Ying, Taouyan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/823,214

(22) Filed: Apr. 12, 2004

(65) Prior Publication Data

US 2005/0225272 A1    Oct. 13, 2005

(51) Int. Cl.
*H02P 1/18*    (2006.01)

(52) U.S. Cl. .............. 318/254; 318/805; 318/771; 318/798; 318/138; 318/439

(58) Field of Classification Search ............ 318/254, 318/599, 811, 805
See application file for complete search history.

(56) References Cited

U.S. PATENT DOCUMENTS

| | | | | |
|---|---|---|---|---|
| 4,409,526 A | * | 10/1983 | Yamauchi et al. | 318/254 |
| 4,622,500 A | * | 11/1986 | Budelman, Jr. | 388/811 |
| 4,654,566 A | | 3/1987 | Erdman et al. | 318/254 |
| 5,227,943 A | * | 7/1993 | Cargille | 361/88 |
| 5,469,033 A | | 11/1995 | Huang et al. | 318/439 |
| 5,532,561 A | | 7/1996 | Huang et al. | 318/439 |
| 5,594,322 A | * | 1/1997 | Rozman et al. | 322/10 |
| 5,859,520 A | | 1/1999 | Bourgeois et al. | 318/805 |
| 5,923,133 A | * | 7/1999 | Menegoli | 318/254 |
| 5,929,577 A | * | 7/1999 | Neidorff et al. | 318/254 |
| 6,633,145 B2 | * | 10/2003 | Shao et al. | 318/254 |

* cited by examiner

*Primary Examiner*—Lincoln Donovan
*Assistant Examiner*—Renata McCloud
(74) *Attorney, Agent, or Firm*—J.C. Patents

(57) ABSTRACT

A circuit for controlling a brushless permanent magnet motor is provided. The circuit comprises windings, each of the windings having a first end connected at a common node and each of the windings having a second end connectable directly to supply voltages by switches, the second end connected to an upper supply voltage or connected to a lower supply voltage or disconnected from the supply voltages; blocking circuitry connectable with the second ends, the blocking circuitry producing a blocked voltage; a comparator receiving the blocked voltage on one input and a reference voltage on another input, the comparator result indicating polarity of a back emf voltage in the associated winding; and a latch providing control signals for the circuit, an input of the latch enabled by an enable signal, an output of the latch comprising a back emf voltage detection signal. The blocking circuitry and the comparator are duplicated for each of the windings.

4 Claims, 7 Drawing Sheets

CIRCUIT AND METHOD FOR CONTROLLING BRUSHLESS DC MOTOR

BACKGROUND OF THE INVENTION

1. Field of the Invention

The present invention relates in general to the control of a brushless DC (BLDC) motor. More particularly, the present invention relates to control a sensorless BLDC motor without Hall sensors.

2. Description of Related Art

FIG. 1 shows a schematic diagram for a BLDC motor drive. Such a motor usually comprises three phases A, B and C. The three phases A, B and C may be connected in a star configuration having a common node N as shown in FIG. 1, or in a delta configuration. For each phase, switch pairs XSA, XGA; XSB, XGB; XSC, XGC connect the free ends of the phases A, B, C to supply a power source Vs and a ground GND, respectively. The switches XSA, XGA, XSB, XGB, XSC, XGC are typically power transistors. Reverse biased diodes DSA, DGA; DSB, DGB; DSC, DGC are connected in parallel to the corresponding switches XSA, XGA, XSB, XGB, XSC, XGC.

The BLDC motor is controlled by detecting the position of the rotor, then a current is applied to the stator according to the detected position. Three Hall sensors are widely used as a position sensor for the BLDCM. However, the Hall sensors themselves increase the motor system size and manufacturing costs. Many position sensorless BLDCM drivers that detect the rotor position from the back electromotive force (BEMF) generated in the phases, have been introduced.

FIG. 2 shows a relationship between the BEMFs and armature currents of stator windings. The motor is controlled through six steps s1, s2, s3, s4, s5 and s6. In each step, the current is conducted in only two phases, and the third phase is floating. The BEMF can be monitored from the terminal voltage of the floating phase. The commutation events occur at 30° delayed from the corresponding zero-crossing points (ZCP) of the BEMF waveforms.

U.S. Pat. No. 4,654,566 describes such a motor control system, which is based on sensing the difference between the virtual neutral potential and the voltage at the floating terminal. For the motor driven by a main power, the supply voltage Vs may be 300V respective to ground GND. The monitored BEMF must be attenuated into an allowable range for the sensing circuit. Therefore, the method tends to have a narrow speed range and a poor signal to noise ratio.

To achieve wide speed range, especially at a lower speed, U.S. Pat. No. 5,859,520 describes a direct BEMF detection circuit E referring to FIG. 3. With the clamping circuitry C, there is no attenuation of the monitored BEMF, which has good resolution even at low speed operation. However, the resistor R for limiting the injected current has a high value, such as 100 kΩ. The BEMF zero crossing detection is not correct sometimes when the PWM duty cycle is high. This is caused by the large time constant of the current limit resistor and the parasitic capacitance inside the microcontroller.

SUMMARY OF THE INVENTION

According to the foregoing description, an object of this invention is to provide a method and a circuit for controlling a brushless DC motor without using position sensors. Therefore, the motor system size and manufacturing costs can be reduced, and a wider speed range and a good signal to noise ratio can be provided.

According to the objects mentioned above, the present invention provides a circuit for controlling a brushless permanent magnet motor. The circuit comprises a plurality of windings, each of the windings having a first end connected at a common node and each of the windings having a second end connectable directly to supply voltages by switches, the second end connected to an upper supply voltage or connected to a lower supply voltage or disconnected from the supply voltages; blocking circuitry connectable with the second ends, the blocking circuitry producing a blocked voltage; a comparator receiving the blocked voltage on one input and a reference voltage on another input, the comparator result indicating polarity of a back emf voltage in the associated winding; and a latch providing control signals for the circuit, an input of the latch enabled by an enable signal, an output of the latch comprising a back emf voltage detection signal. The blocking circuitry and the comparator are duplicated for each of the windings.

In addition, the present invention further provides a circuit for controlling a brushless permanent magnet motor. The circuit comprises a plurality of windings, each of the windings having a first end connected at a common node and each of the windings having a second end connectable directly to supply voltages by switches, the second end connected to an upper supply voltage or connected to a lower supply voltage or disconnected from the supply voltages; a single blocking circuitry periodically connected to the second ends for producing a blocked voltage; a comparator receiving the blocked voltage on one input and a reference voltage on another input, the comparator result indicating polarity of a back emf voltage in the associated winding; and a latch providing control signals for the circuit, an input of the latch enabled by an enable signal, an output of the latch comprising a back emf voltage detection signal.

The present invention further provides a circuit for driving a brushless DC motor. The circuit comprises a plurality of windings constructed to a star configuration, each of the windings having a first end connected at a common node and each of the windings having a second end connectable directly to supply voltages by switches, the second end connected to an upper supply voltage or connected to a lower supply voltage or disconnected from the supply voltages; a plurality of blocking circuits, each coupled to a free end of each winding to blocking a voltage at the free end to a blocked voltage indicative of the winding; a plurality of comparators, each receiving the blocked voltage generated by each blocking circuit on one input and a reference voltage on another input, the comparator result indicating polarity of a back emf voltage in the associated winding; and a plurality of latches, each providing control signals for the circuit, an input of the latch enabled by an enable signal, an output of the latch comprising a back emf voltage detection signal.

In the aforementioned circuits, the blocking circuit can further comprises a diode with its cathode end connected to the second end, and a resistor with one end connected to the blocked voltage and the other connected to a DC power source.

The present invention further provides a method for controlling a brushless DC motor. The brushless DC rotor comprises a rotor capable of generating a back electromotive force. The method comprising steps of: determining whether a time of a zero crossing point for the back electromotive force is detected; determining a rotor speed of the brushless DC motor is smaller than a lower speed if the time of the zero crossing point is detected; reducing a frequency of a control signal if the rotor speed is smaller than the lower speed; determining again whether there is a time of a zero crossing point; and resetting the frequency of the control signal if the time of the zero crossing point is detected again.

In the above method, whether a time of a zero crossing point is determined again when the rotor speed is larger than the lower speed. When the zero crossing point is not detected, the method is terminated. The control signal is a pulse width modulation (PWM) signal. In step of resetting the frequency, the frequency is reset to a normal operation frequency.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings.

DETAILED DESCRIPTION OF THE PREFERRED EMBODIMENTS

The present invention will now be described more fully hereinafter with reference to the accompanying drawing, in which a preferred embodiment of the invention is shown.

Figure 3:
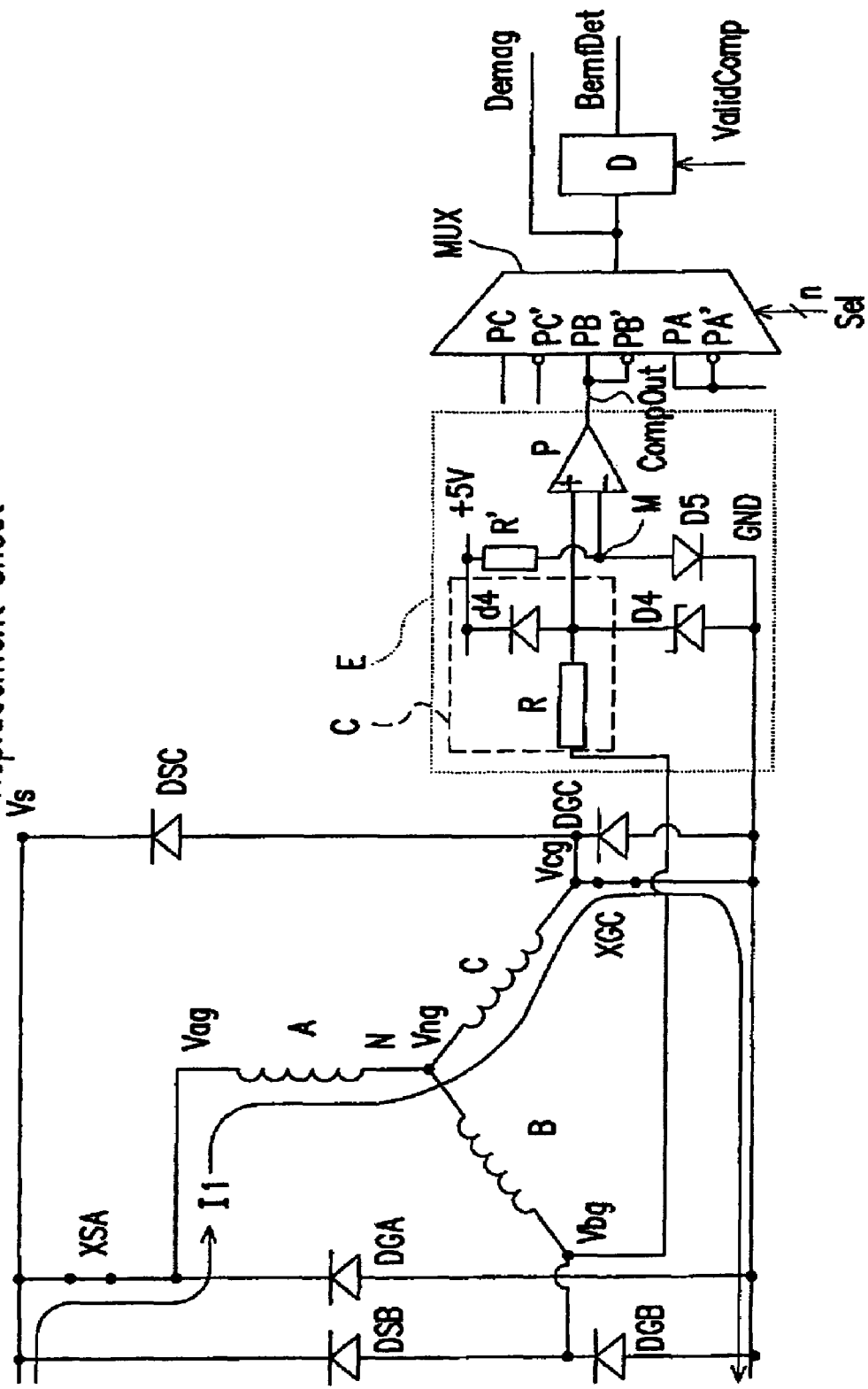
FIG. 3 shows the direct BEMF detection circuit described in U.S. Pat. No. 5,859,520 according to a prior art.
Figure 4:
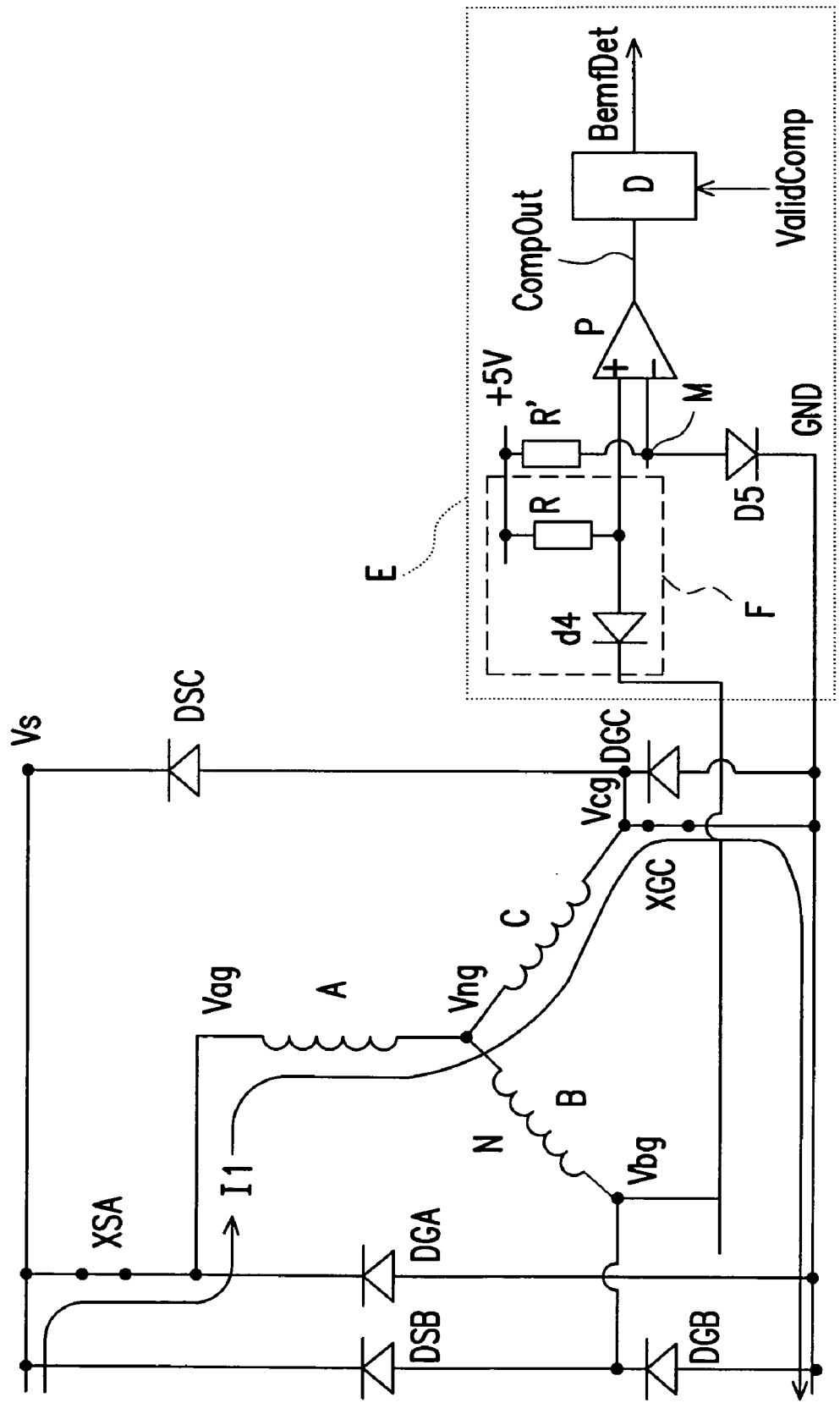
FIG. 4 and FIG. 5 show a schematic diagram of a circuit for controlling a motor according to the invention during certain periods.
Figure 5:
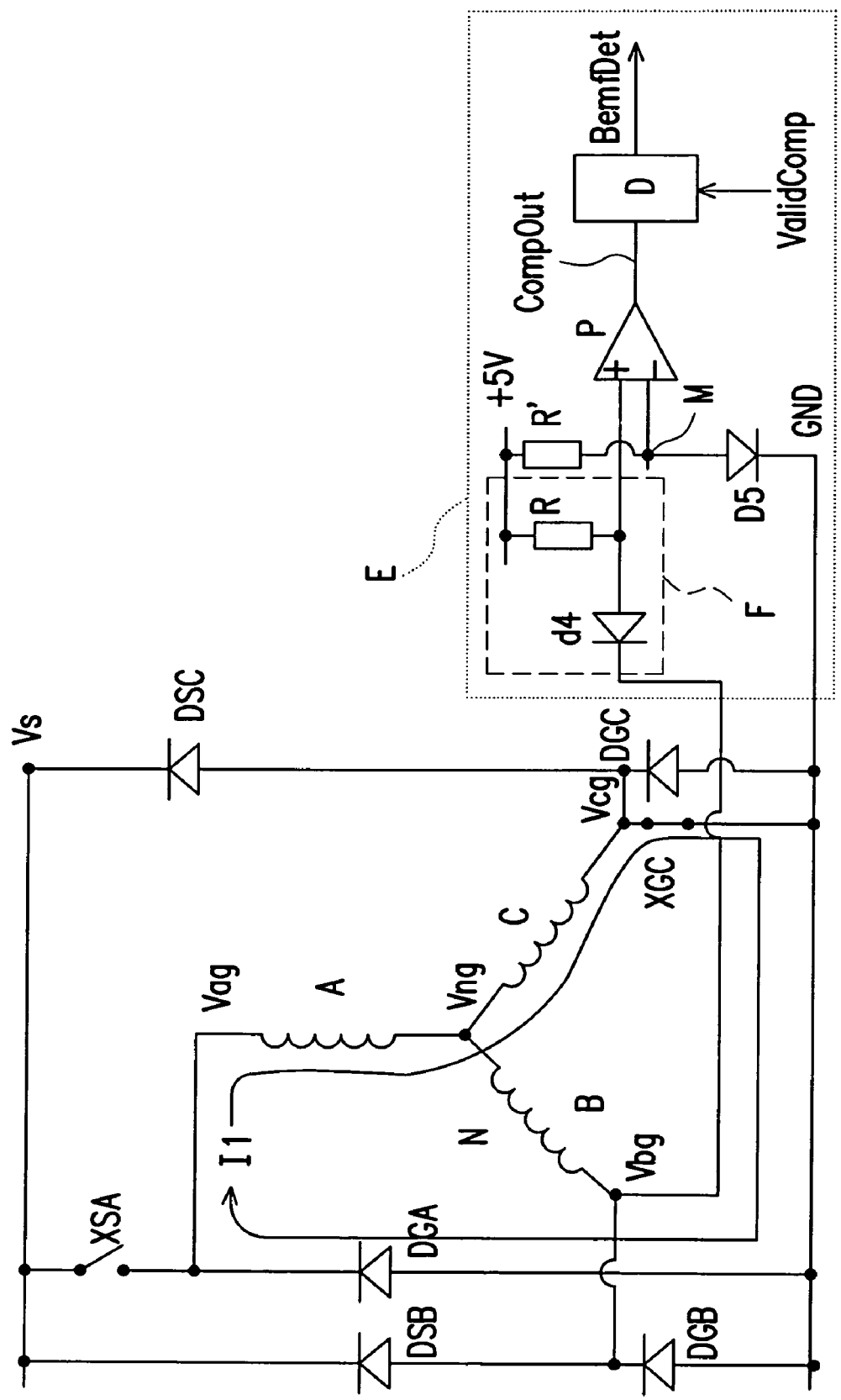

FIGS. 4 and 5 show a circuit according to one embodiment of the present invention for measuring a BEMF in the windings of the motor. Elements with the same or similar functions as FIG. 3 are labeled with the same numerals.

Figure 1:
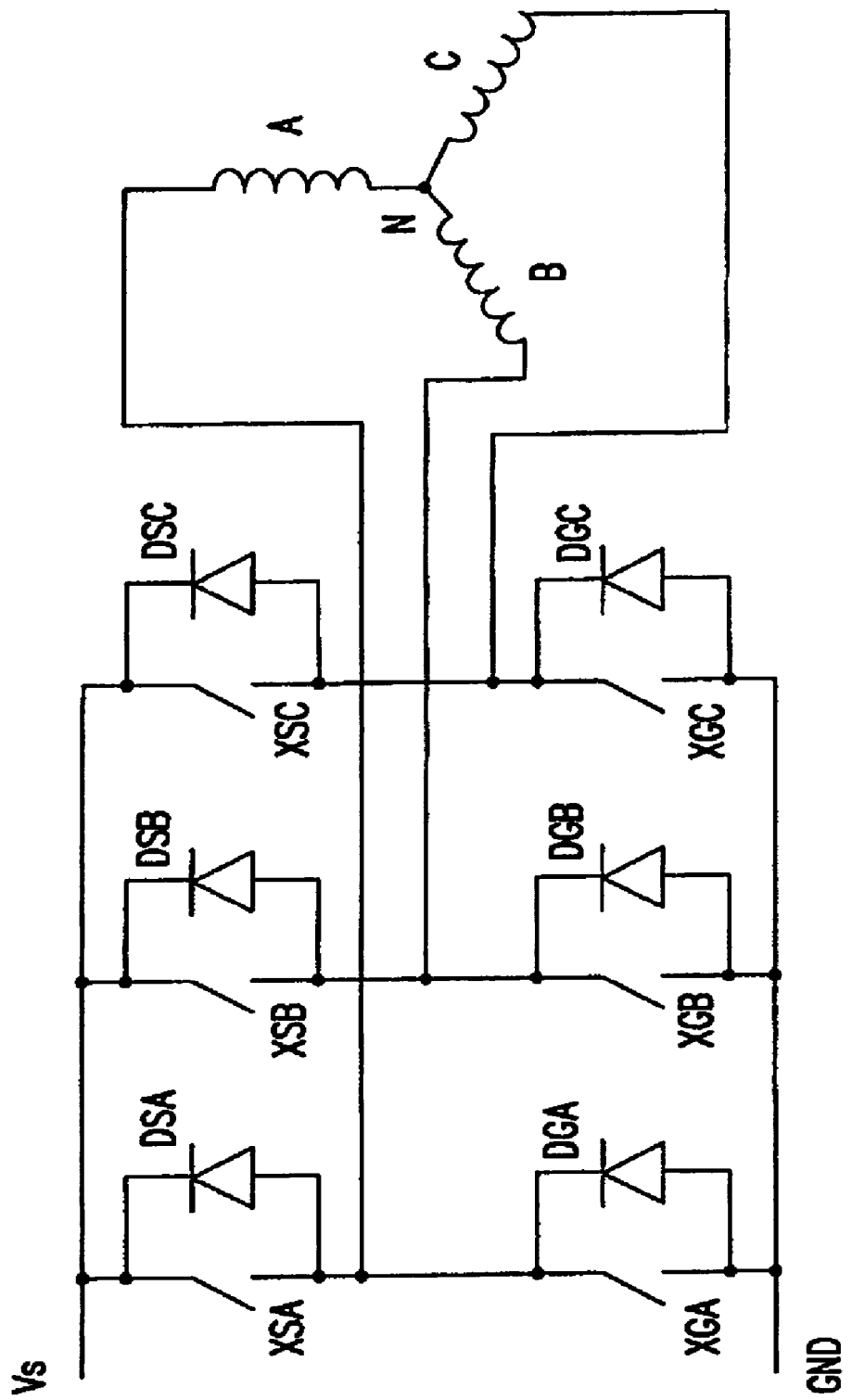
FIG. 1 shows a schematic diagram for a BLDC motor drive according to a prior art.

Referring to FIG. 4 and FIG. 1, the circuits allow the measurement of the BEMF in winding B. The windings A, B, C are connected in star formation with a common node N. The terminal voltage of the windings A, B, C relative to the ground voltage GND will be referred to as Vag, Vbg, Vcg respectively. The voltage at the common node N relative to the ground GND will be referred to as Vng. For each phase, switch pairs XSA, XGA, XSB, XGB, XSC, XGC connect to the free ends of the phases A, B, C to supply power source Vs and ground GND, respectively. Reverse biased diodes DSA, DGA; DSB, DGB; DSC, DGC are connected in parallel with the corresponding switches XSA, XGA, XSB, XGB, XSC, XGC.

Figure 2:
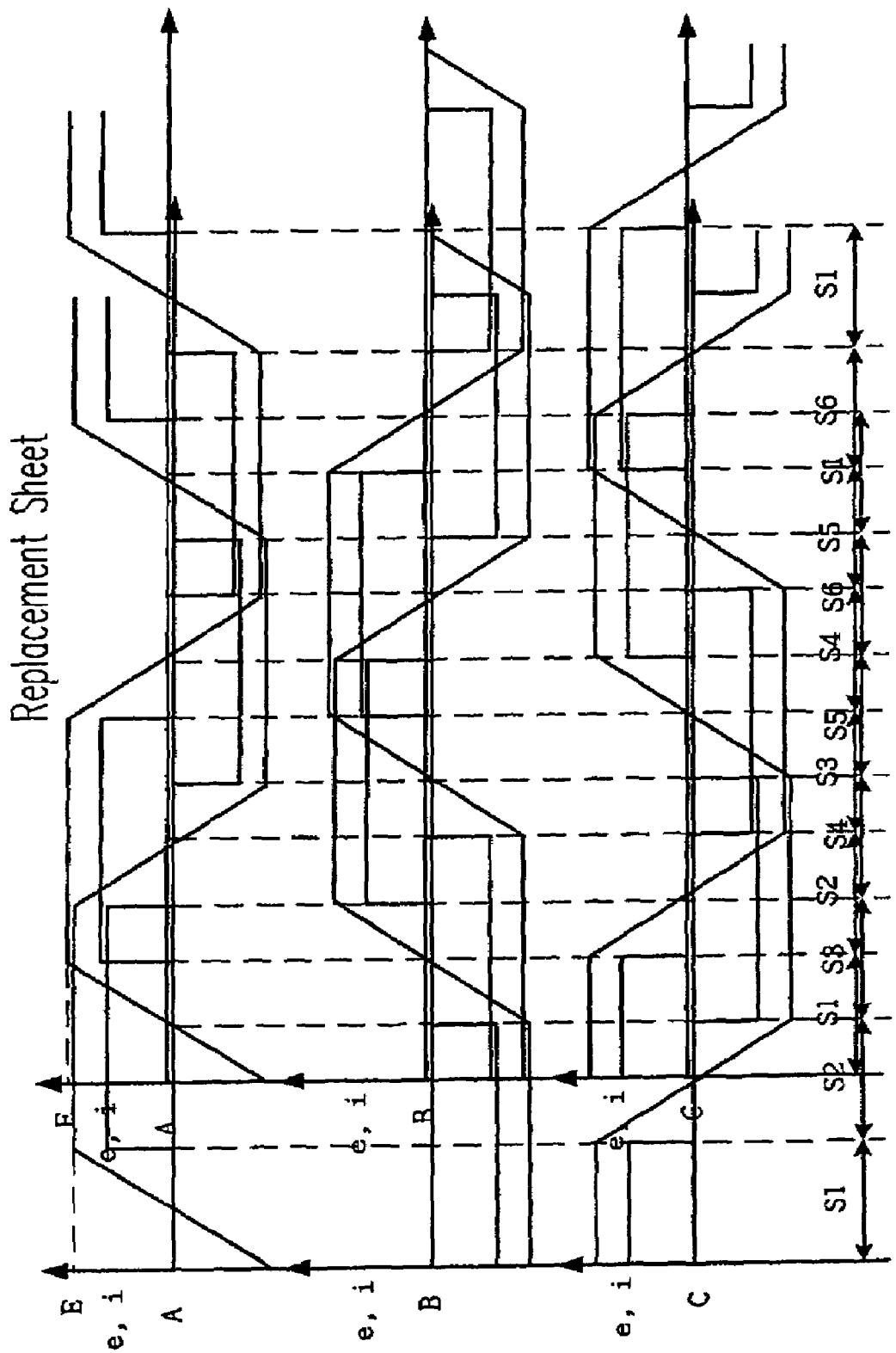
FIG. 2 shows relationship between the BEMFs and the armature current of stator windings of FIG. 1.

The features described above are also shown in FIG. 2, and represent a particular configuration of the step s3 in FIG. 2. The switch XGC is kept ON during the whole step s3, and the switch XSA is controlled to turned on and off according to a pulsed signal. The forward voltage of the switches XSA, XGA, XSB, XGB, XSC, XGC and diodes DSA, DGA; DSB, DGB; DSC, DGC are neglected.

Referring to FIGS. 4 and 5, position detection circuits E are connected to each of the phases A, B, C, but only one position detection circuit E is depicted for simplicity. A voltage comparator P of the position detection circuit E has a non-inverting input connected via a diode d4 to the free end of phase B, and also to an auxiliary +5V voltage supply by a resistor R. The comparator P also has an inverting input connected to a node M between a resistor R' and a forward biased diode D5 that are connected respectively in series between the auxiliary +5V supply and ground GND. The output CompOut of the comparator P is connected to an input of a latch D. The latch D is controlled by an enable signal ValidComp. The output of the latch D is $Z_B$, i.e., a BEMF ZCP detection signal, BemfDet, that is supplied to a central processing unit CPU (not shown). These elements form circuitry E, which is repeated three times, once for each winding. Alternatively, a single circuitry E may be provided, connectable by controlled switches to each of the winding A, B, C. Also, the latch D can be replaced by the software.

FIG. 4 shows the motor control circuit at an instant during a PWM "on" period within step s3, ignoring a commutation interval. In FIG. 4, the PWM "on" period is referred to as t2. The switch XSA is controlled by a PWM signal, for example. In the instant as shown in FIG. 4, the power source Vs (300V) is supplied to the free end of the winding A. The ground voltage GND is supplied to the free end of the winding C through the switch XGC, while the winding B is disconnected to either 300V of the power source Vs, or the ground voltage GND. A current I1 flows in the windings A and C, but there is no current flowing in the winding B.

The node N voltage Vng is at approximately 150V due to a voltage divider effect of the windings A and C. As the winding B is disconnected to either the 300V power source Vs, or the ground voltage GND, the terminal voltage Vbg of winding B is offset by the 150V of the node N voltage Vng. Therefore, the diode d4 is blocked off.

As shown in FIG. 5, when switch XSA is opened due to the operation of the PWM control, the inductance of the windings A and C maintains the current I1 flowing in an arrow direction as shown. This current I1 biases diode DGA forwards, holding a zero voltage between the terminal voltages of the windings A and C. This means that the node N voltage Vng will be about zero. This period is referred to as t1 in FIG. 6.

As the motor is running, a BEMF is induced in the winding B by the rotor, and the BEMF appears at Vbg at this period. When the BEMF is negative, the voltage Vbg is clamped to zero by the diode DGB.

To detect the BEMF and in particular the zero crossing points of BEMF, a reference voltage needs to be defined for a voltage comparison. The inverting input node M of the voltage comparator P is held at about 0.7V by the forward voltage of diode D5. Although the free end voltage Vbg of the phase B varies between 300V and zero values, the input to the comparator P is limited to vary between 5V and +0.7V by the diode d4 and the resistors R. By comparing the voltage Vbg, which contains the BEMF, with the +0.7V fixed by D5, the output CompOut of the comparator P gives a signal indicative of a polarity of the BEMF in the winding B. This signal is continually switched high and low as the power source Vs is applied to the winding A by turning on and off switch XSA. The output CompOut is connected to the input of the latch D, which is clocked by an enable signal ValidComp to record the polarity of the BEMF each time when the signal ValidComp is at a high value. As discussed below, this high value occurs near to the end of a PWM "off" period.

The circuit as shown in FIGS. 4 and 5 may equally be used with delta-connected motors, but the derivation of the actual BEMF in a winding is slightly more complicated.

Figure 6:
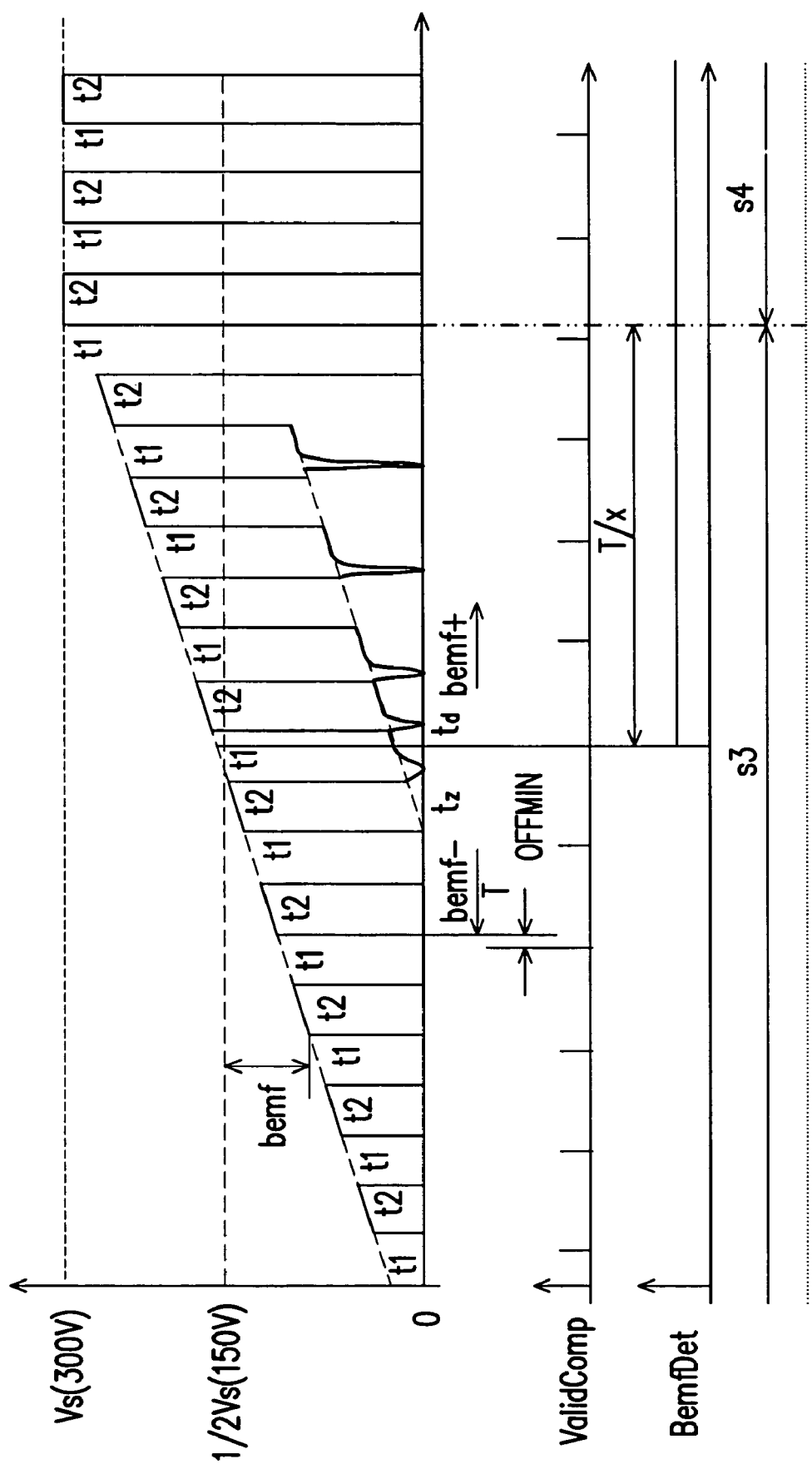
FIG. 6 shows voltages present in the circuits of FIG. 4 and FIG. 5.

FIG. 6 shows a typical voltage-time signal for the terminal voltage of the floating phase B, referenced to ground voltage GND and ignoring the commutation interval. The time axis is magnified to enable a visibility of the PWM control. The signal ValidComp for enabling the latch D and the output BemfDet of the latch D are also shown. The time period represented covers the step s3 and its next step s4 in FIG. 2.

The BEMF is visible on the voltage Vbg as an amount bemf, either subtracted from the mid value of the power source Vs (300V), during each PWM "on" period t2, or added to the ground GND when the power source Vs is disconnected (FIG. 5) during a bemf+ period. It can be seen that during each PWM "off" transition from t2 to t1, the voltage Vbg goes fully to ground level. This is due to the discharging procedure of the parasitic capacitance inherent in the switches and the motor. Therefore, the value of the BEMF can only be meaningfully measured near to the end of the PWM off period t1. Since the control of the motor is performed by the CPU, the BEMF sampling instant can be easily timed, because the CPU knows when the end of each PWM off period will be.

At an instant tz, a BEMF zero crossing occurs. After the instant tz, the BEMF is positive. The instant tz is thus the zero crossing point (ZCP) that needs to be detected.

In a system controlled according to the invention, a minimum PWM "off" period, $T_{OFFMIN}$, as shown in FIG. 6, must be provided to allow sampling the BEMF. The signal ValidComp is generated synchronously by the CPU according to the timer that is used to generate the PWM signal.

When the motor speed is very low, the signal of the BEMF is very small. The effect of the parasitic capacitance becomes worse, the BEMF sampling period tends to be narrower than $T_{OFFMIN}$.

Figure 7:
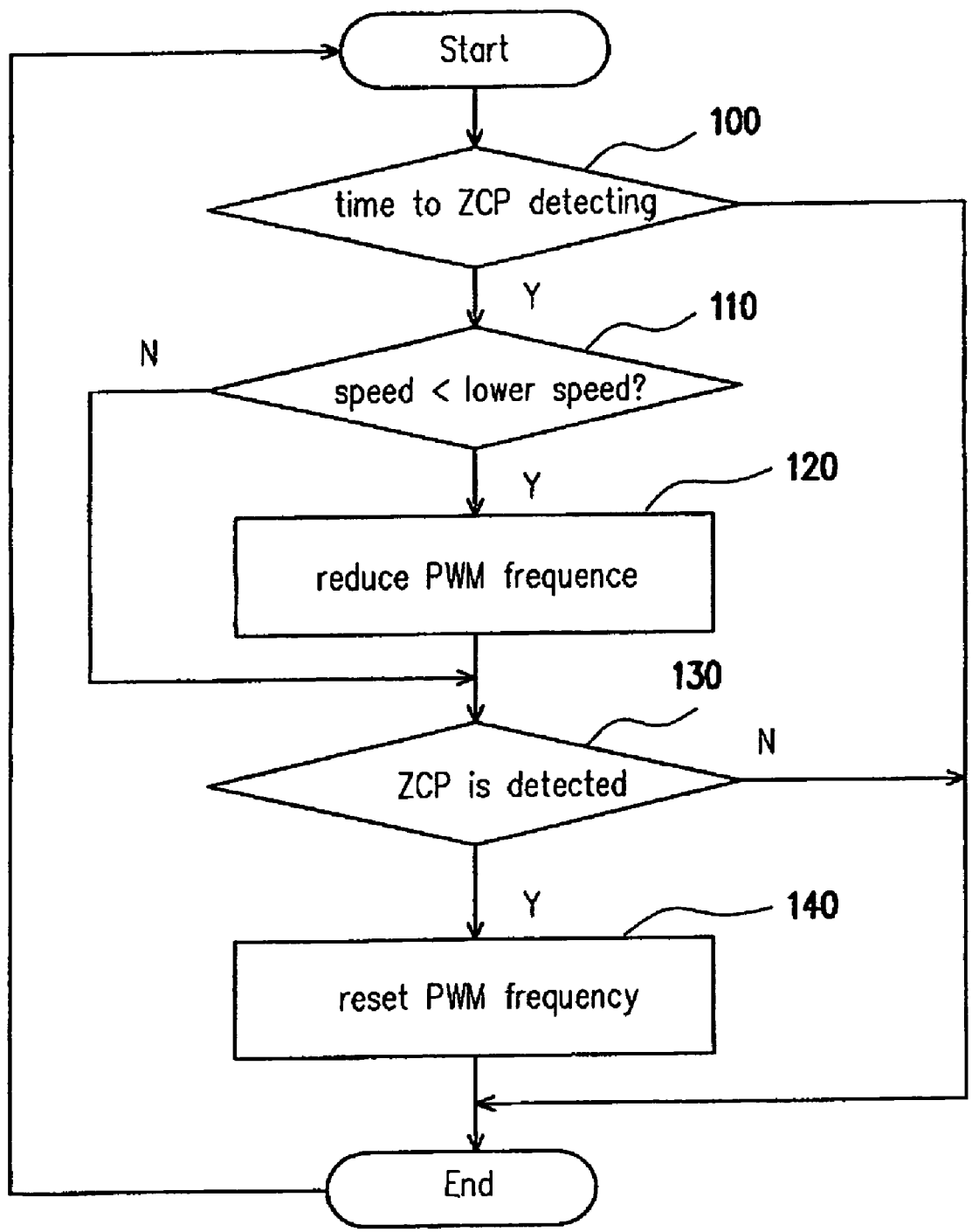
FIG. 7 shows a simplified flow chart diagram of a method of the present invention.

FIG. 7 shows a simplified flow chart diagram of a method according to the present invention to enlarge the BEMF sampling period. At step 100, whether it is time to ZCP detecting is determined, i.e., whether the expected commutation interval elapses. If not, the process moves to end. If it is time to ZCP detecting, whether the rotor speed is less than the lower speed is detected at step 110. The rotor speed is computed from the interval of the BEMF ZCPs. The lower speed may be 80 rpm for a BLDCM 90ZW(Ke=0.084V/rpm). If the rotor speed is less than the lower speed, the frequency of PWM, which is synchronized to the enable signal CP, is reduced to enlarge the BEMF sampling period. Then, the process moves to step 130. On the other hand, if the rotor speed is not less than the lower speed, the process moves to step 130 directly. In step 130, whether a BEMF ZCP is detected is determined. If there is no BEMF ZCP, the process is terminated. If the BEMF ZCP is detected, the frequency of the PWM is reset to a normal operation frequency. The process may be performed periodically interrupt.

The BEMF has crossed the zero value around the instant tz as shown in FIG. 6, while the positive BEMF value is detected as a change in signal BemfDet when the next signal ValidComp comes at time td. The detection of the BEMF ZCP is thus performed to the next cycle of the PWM control. For a 5 kHz PWM, this will introduce a maximum error of only 200 μs.

Timing of the period T/x begins at this instant, where T is the interval between the two consecutive ZCP, and x is a constant. The interval T used to calculate T/x is of the last two consecutive BEMF ZCP or the previous two consecutive BEMF ZCP. The previous BEMF ZCP may be intended for compensation in case of dissymmetrical motors. The constant x may be adjusted in real time to take account to variations in the mechanical loading of the motor, the required acceleration, required stability and efficiency. When the period T/x elapses, commutation is performed to begin step s4, connecting the winding B to the power source Vs and disconnecting the winding A from the power source Vs. During this step s4, the BEMF measurement is performed on the winding A.

The magnitude of the BEMF depends on the speed of the rotor. As the circuit E does not divide the BEMF, no matter what its magnitude is, the ZCP is detected far more reliably because the rate of change of the BEMF seen by the comparator at zero crossing is the actual rate of change of the BEMF. It is not divided, nor filtered, either of which would reduce the speed or accuracy of zero crossing detecting. In addition, the diode d4 not only blocks the high voltage, but also eliminates the wrong BEMF detection caused by the large time constant due to the large current limit resistor described in U.S. Pat. No. 5,859,520.

The power supply Vs of 300V described is often used for mains controlled motors operating from 220–250 Vrms mains. The invention applies equally to use with motors at very different supply voltages, varying at least between 12V and 1200V. Although described in relation to a motor having three windings, the method and the circuit of the invention is easily adapted to motors with fewer or more windings. Different step configurations than that illustrated herein are possible, along with the use of unipolar biasing to the windings, where each winding has its free end connected to one power source by a reverse biased diode (DGA, DGB, DGC), and to the other supply voltage by a switch (XSA, XSB, XSC). The PWM control may be effected by periodically disconnecting only one or other of the supply and ground voltage Vs, GND. Such applications remain within the scope of the invention.

Although described with reference to pulse width modulation control, the invention also applies to motors not controlled in such a way, provided always that periods $T_{OFFMIN}$ are provided to allow the required measurements to be made.

Although described with the zero crossing detection carried out during every step, it is possible to reduce the number of detections. For example, it is possible to perform a single detection corresponding to one of the step s1–s6, during each sequence of steps and then use memorized information for the other steps in the sequence. The memorized information is periodically refreshed.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A circuit for controlling a brushless permanent magnet motor comprising:
   a plurality of windings, each of the windings having a first end connected at a common node and each of the windings having a second end connectable directly to supply voltages by switches, the second end connected to an upper supply voltage or connected to a lower supply voltage or disconnected from the supply voltages;

blocking circuitry connectable with the second ends, the blocking circuitry producing a blocked voltage, the blocked Voltage representing a voltage across an associated winding;

a comparator receiving the blocked voltage on one input and a reference voltage on another input, the comparator result indicating polarity of a back emf voltage in the associated winding, wherein one input of the comparator is connected via a single direction switch to the second end of a winding and said single direction switch has an anode connected to one input of the comparator and a cathode to receive voltage signal from the second end of a winding; and a latch providing control signals for the circuit, an input of the latch enabled by an enable signal, an output of the latch comprising a back emf voltage detection signal, wherein the blocking circuitry and the comparator are duplicated for each of the windings.

2. The circuit of claim 1, wherein the blocking circuit further comprises:

a diode with a cathode end connected to the second end; and a resistor with one end connected to an anode end of the diode and the other end connected to a DC power source.

3. A circuit for controlling a brushless permanent magnet motor comprising:

a plurality of windings, each of the windings having a first end connected at a common node and each of the windings having a second end connectable directly to supply voltages by switches, the second end connected to an upper supply voltage or connected to a lower supply voltage or disconnected from the supply voltages;

a single blocking circuitry periodically connected to the second ends for producing a blocked voltage;

a comparator receiving the blocked voltage on one input and a reference voltage on another input, the comparator result indicating polarity of a back emf voltage in the associated winding, wherein one input of the comparator is connected via a diode to the second end of a winding and said diode has an anode connected to one input of the comparator and a cathode to receive voltage signal from the second end of a winding; and a latch providing control signals for the circuit, an input of the latch enabled by an enable signal, an output of the latch comprising a back emf voltage detection signal.

4. The brushless DC motor module of claim 3, wherein the blocking circuit further comprises:

a second diode with a cathode end connected to the second end; and a resistor with one end connected to an anode end of the second diode and the other end connected to a DC power source.

* * * * *